P. P. GLOR.
PREHEATER.
APPLICATION FILED JUNE 22, 1915.

1,177,510.

Patented Mar. 28, 1916.

Witnesses

Inventor
Peter P. Glor,
By Victor J. Evans
Attorney

UNITED STATES PATENT OFFICE.

PETER P. GLOR, OF ATTICA, NEW YORK.

PREHEATER.

1,177,510.  Specification of Letters Patent.  Patented Mar. 28, 1916.

Application filed June 22, 1915. Serial No. 35,606.

*To all whom it may concern:*

Be it known that I, PETER P. GLOR, a citizen of the United States, residing at Attica, in the county of Wyoming and State of New York, have invented new and useful Improvements in Preheaters, of which the following is a specification.

This invention relates to a preheater designed particularly for use in preheating maple sap, sorghum, and other liquids where continuous boiling is necessary.

The object of the invention is to provide a device for preheating the maple sap or other liquid before it reaches the boiling sap or liquid in the pan, without the use of any extra fuel.

The invention consists of the features of construction, combination and arrangement of parts herein fully described and claimed, reference being had to the accompanying drawings in which:—

Figure 1:
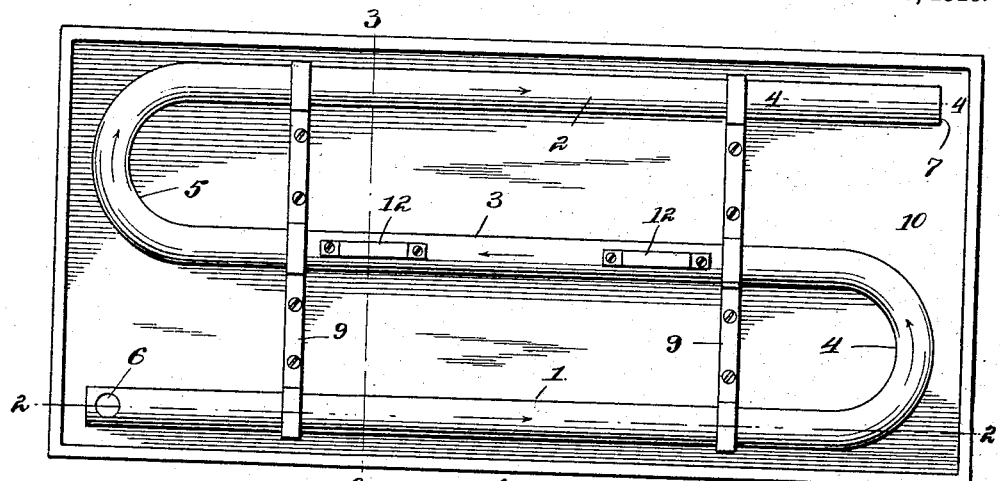
Figure 2:
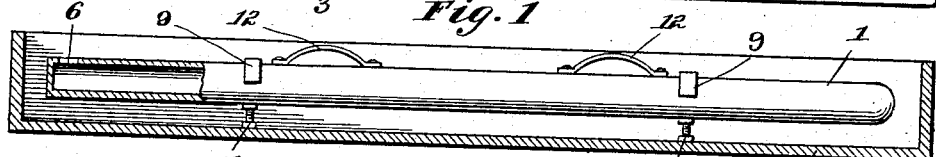
Figure 3:
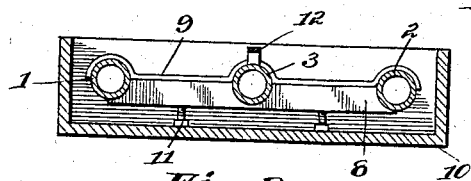
Figure 4:
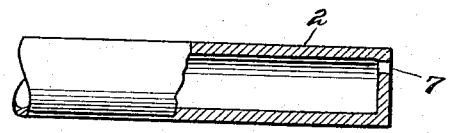
Figure 5:
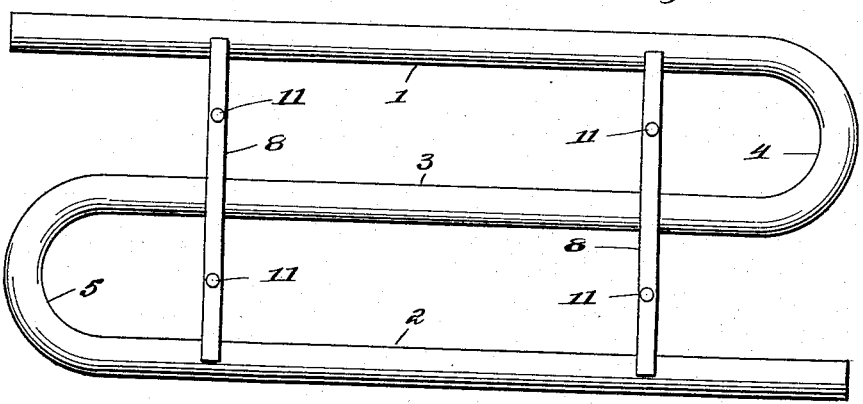

Figure 1 is a top plan view of a boiling or evaporating pan showing the preheater arranged therein for use. Fig. 2 is a vertical longitudinal section on the line 2—2 of Fig. 1. Fig. 3 is a vertical transverse section on the line 3—3 of Fig. 1. Fig. 4 is a longitudinal section on the line 4—4 of Fig. 1. Fig. 5 is a bottom plan view of the preheater, parts appearing in section.

In carrying my invention into practice, I provide a preheater in the form of a heating coil, which is shown in the present instance of consisting of three parallel pipes or tubes 1, 2 and 3, the pipes being connected alternately at opposite ends of the coil by means of return portions or bends 5, thus providing a zigzag or circuitous conduit for the travel of the sap or liquid, by which the sap or liquid may have a long range of flow within a restricted space for an efficient preheating action.

As shown in the present instance, the pipe 1 is provided with an inlet 6 at one end, which forms one extremity of the coil, for the introduction of the cold sap or liquid, while the pipe 2 is provided at one end, which serves as the discharge end of the coil, with an outlet 7, the said inlet 6 and outlet 7 being disposed at diagonally opposite portions of the coil. The other end of the pipe 1 is connected by the return bend 4 with the adjacent end of the pipe 3, while the opposite end of the pipe 3 is connected by the return bend 5 of the receiving end of the pipe 2, so that the sap or liquid will flow, as shown by the arrows in Fig. 1, through the inlet 6 along the length of the pipe 1, thence through the union or return portion 4, then in a reverse direction through the pipe 3, then through the union or return portion 5 to the pipe 2, and then through the pipe 2 to the outlet 7.

The pipes are tied and connected by transversely extending bars 8, arranged on opposite sides of the transverse center thereof, and metallic straps 9 extending over the pipes and secured to the bars, thus firmly fastening said pipes to the bars and holding the pipes against relative movement or displacement. The bars project beneath the pipes so as to form sills or supports, adapted to rest upon the bottom of the boiling pan or evaporator 10, to hold the pipes spaced at a suitable elevation above the same, allowing all portions of the pipes to be submerged in the body of sap or liquid which is being boiled. Preferably, the bars 8 carry screw jacks or supports 11, adapted to rest directly upon the bottom of the pan, and which may be adjusted in and out, thus allowing the preheater to be supported at a greater or less level above the bottom of the pan as may be found most desirable or advantageous in service. Handles 12 are suitably applied to the preheater to permit it to be lowered into the tank and raised and removed therefrom and conveniently transported from place to place, the device thus being adapted for use in connection with any ordinary evaporating pan or tank and being readily removable so that the pan and preheater may be easily and conveniently cleaned.

An important part of my invention consists in the relative arrangement of the inlet 6 and the outlet 7 at the opposite ends of the coil. It will be observed that the inlet end of the pipe 1 is closed except at the top where the inlet opening 6 is provided, and which communicates with the uppermost portion of the channel of said pipe, while the outlet 7 is arranged directly in the end of the pipe 2, but to a greater or less degree above the horizontal center of said pipe. By this relative arrangement of the inlet and outlet, it is evident that the preheater pipes must be filled approximately full before the sap discharges through the constricted opening 7, by which the cold sap to be preheated is retarded in its flow and given more time to heat while passing through the preheater, so that when discharged it will be at substantially the same temperature as the body of sap which is being boiled, thus preventing the latter from being chilled. This preheating of the sap requires a sufficient amount of heat to be absorbed which obviates any liability of the boiling sap being unduly heated, while obviating the necessity of employing additional fuel or heating means for the preheating operation. The device thus prolongs the heating period of the sap, and at the same time serves as a safety device for preventing the sap from being scorched or otherwise injured through being heated to an unduly high degree.

In the use of the device, the preheater is placed in the pan and submerged in the boiling sap therein with the inlet 6 projecting above the level of the body of sap, and the preheating operation is started by letting the cold sap discharge by gravity from a storage or other receptacle into the preheater through the inlet 6, the sap being heated by the heat from the boiling sap and discharged in a heated condition into the pan. Of course, instead of submerging the heater in the body of boiling sap it may be supported by the supporting members above the level of the sap so that the pipes will be heated by the waste heat rising from the sap, thus avoiding the direct abstraction of heat from the body of sap while utilizing the waste heat for preheating purposes. The preheater is of course intended to be kept reasonably full at all times in order to prevent the sap therein from becoming scorched. In addition to the advantages stated it will be understood that it may be used in connection with different styles of pans and will be found of great value to operators of such pans in effecting the boiling of the sap to the necessary degree within less than the usual time, and in the preheating of the sap whereby such result may be obtained.

I claim:—

A preheater for use in boiling or evaporating pans, comprising a horizontally disposed coil having inlet and exit ends, said inlet and exit ends being provided respectively with inlet and exit openings arranged above the horizontal center of the coil, cross pieces secured to and uniting the pipes of the coil, and threaded supporting members carried by said cross pieces, whereby the coil may be adjustably supported within a pan to set at a greater or less level above the bottom of the pan.

In testimony whereof I affix my signature in presence of two witnesses.

PETER P. GLOR.

Witnesses:
CLARENCE R. SEELY,
FRANK A. GODFREY.